US012065842B2

(12) United States Patent
Dombrowski et al.

(10) Patent No.: US 12,065,842 B2
(45) Date of Patent: Aug. 20, 2024

(54) DRYWALL MUD APPLICATOR TOOL

(71) Applicant: Can-Am Tool Corp., Sturgeon County (CA)

(72) Inventors: Wolfgang Dombrowski, Sturgeon County (CA); Micah Warkentin, Edmonton (CA)

(73) Assignee: Can-Am Tool Corp., Sturgeon County (CA)

( * ) Notice: Subject to any disclaimer, the term of this patent is extended or adjusted under 35 U.S.C. 154(b) by 482 days.

(21) Appl. No.: 17/307,520

(22) Filed: May 4, 2021

(65) Prior Publication Data

US 2021/0340780 A1 Nov. 4, 2021

(30) Foreign Application Priority Data

May 4, 2020 (CA) ................................ CA 3080194

(51) Int. Cl.

*E04F 21/08* (2006.01)
*B05C 1/00* (2006.01)
*E04F 21/165* (2006.01)

(52) U.S. Cl.

CPC ................ *E04F 21/08* (2013.01); *B05C 1/00* (2013.01); *E04F 21/1652* (2013.01)

(58) Field of Classification Search

USPC ........ 118/207, 208, DIG. 17, 205; 401/5, 48
See application file for complete search history.

(56) References Cited

U.S. PATENT DOCUMENTS

| | | | | |
|---|---|---|---|---|
| 3,932,101 A | | 1/1976 | Johnson | |
| 4,116,604 A | | 9/1978 | Johnson | |
| 4,767,297 A | | 8/1988 | Mower | |
| 5,010,618 A | | 4/1991 | Croft | |
| 5,240,394 A | | 8/1993 | James | |
| 5,263,836 A | | 11/1993 | Tinawong | |
| 5,386,611 A | | 2/1995 | Kim | |
| 5,562,357 A | | 10/1996 | Sandell | |
| 5,670,182 A | * | 9/1997 | Mower ................. | E04F 21/165 401/5 |
| 5,792,489 A | | 8/1998 | Liberman | |
| D405,958 S | | 2/1999 | Mollack | |
| 6,113,301 A | | 9/2000 | Burton | |
| 6,155,809 A | | 12/2000 | Edwards et al. | |
| 6,247,868 B1 | | 6/2001 | Burton | |

(Continued)

OTHER PUBLICATIONS https:l/cdn2.hubspot.netlhubfs/133874/Tool_Catalogue.pdf?utm_referrer=http%3A%2F%2Fwww.canamtool.com%2F Oct. 7, 2017 (Year: 2017).

*Primary Examiner* — Yewebdar T Tadesse

(57) ABSTRACT

A drywall mud applicator tool includes a body having a wall engaging applicator face, a first end, a second end, a first side and a second side. A first wheel is mounted for rotation on an axle which is secured to the first side adjacent to the first end. A second wheel is mounted for rotation on an axle which is secured to the second side adjacent to the first end. A third wheel is mounted for rotation on an axle which is secured to the first side adjacent to the second end. A fourth wheel is mounted for rotation on an axle which is secured to the second side adjacent to the second end. A first mud containment skirt extends along the first side from the first end to the second end. A second mud containment skirt extends along the second side from the first end to the second end.

20 Claims, 11 Drawing Sheets

(56) References Cited

U.S. PATENT DOCUMENTS

| | | | | |
|---|---|---|---|---|
| 7,182,587 | B1 | 2/2007 | Raney | |
| 7,246,402 | B2 * | 7/2007 | Washburn | E04F 21/1655 425/458 |
| 7,281,291 | B1 | 10/2007 | Hajianpour | |
| 7,674,059 | B2 | 3/2010 | Daigle | |
| 7,707,678 | B2 | 5/2010 | Major | |
| 8,109,313 | B2 | 2/2012 | Rosso et al. | |
| 8,225,448 | B2 | 7/2012 | Vasilakes et al. | |
| D695,018 | S | 12/2013 | Gallardo | |
| 8,628,318 | B1 | 1/2014 | Jalbert | |
| 8,832,897 | B2 | 9/2014 | Gallardo | |
| D728,945 | S | 5/2015 | Neal | |
| D771,455 | S | 11/2016 | Ovens | |
| D773,912 | S | 12/2016 | Gringer | |
| D790,297 | S | 6/2017 | Puusaag | |
| 10,161,144 | B2 | 12/2018 | Dombrowski et al. | |
| D848,805 | S | 5/2019 | Dombrowski et al. | |
| 2005/0003682 | A1 | 1/2005 | Brazas | |
| 2005/0005386 | A1 | 1/2005 | MacMillan | |
| 2005/0106278 | A1 | 5/2005 | Hall et al. | |
| 2007/0206985 | A1 | 9/2007 | Daigle | |
| 2008/0086828 | A1 | 4/2008 | Major | |
| 2009/0041536 | A1 | 2/2009 | Cole | |
| 2009/0047882 | A1 | 2/2009 | Collins | |
| 2010/0196078 | A1 * | 8/2010 | Ovens | B05C 11/04 401/48 |
| 2016/0116828 | A1 | 4/2016 | Clearman | |
| 2016/0221026 | A1 | 11/2016 | Despins | |
| 2016/0341243 | A1 | 11/2016 | Ingrassia | |
| 2016/0356049 | A1 * | 12/2016 | Potter | E04F 21/1657 |
| 2018/0187427 | A1 | 7/2018 | Dombrowski et al. | |
| 2019/0010713 | A1 * | 1/2019 | Negri | E04F 21/165 |

* cited by examiner

DRYWALL MUD APPLICATOR TOOL

FIELD

There is described a more ergonomic drywall mud applicator tool.

BACKGROUND

In the past, drywall mud (sometimes referred to as drywall joint compound) was applied using a trowel. Over time, these "trowels" evolved into a family of specialized drywall mud applicator tools of various shapes designed to engage inside corners, outside corners and flat surfaces. An example of a drywall mud applicator tool is U.S. Pat. No. 5,792,489 (Liberman) titled "Plaster Spreading Tool". It is now not uncommon for these tools to be equipped with sockets which accommodate an extension pole, so that these tools can be manipulated by a person standing on the ground. U.S. Design Pat. No. 848,805 (Dombrowski et al '805) titled "Drywall Corner Finisher" is an example of a drywall mud applicator that has a socket to receive a pole.

Skidding a drywall mud applicator along a wall at the remote end of a pole can be physically demanding. There is presently an effort being made to come up with more ergonomic designs which will make this movement easier. In this regard Dombrowski et al '805 discloses a variant that has a set of lower wheels, as does U.S. DPatentsPatent (Dombrowski et al *) titled "Drywall Corner Flusher".

SUMMARY

There is provided a drywall mud applicator tool which includes a body having a wall engaging applicator face, a first end, a second end, a first side and a second side. A first wheel is mounted for rotation on an axle which is secured to the first side adjacent to the first end. A second wheel is mounted for rotation on an axle which is secured to the second side adjacent to the first end. A third wheel is mounted for rotation on an axle which is secured to the first side adjacent to the second end. A fourth wheel is mounted for rotation on an axle which is secured to the second side adjacent to the second end. A first mud containment skirt extends along the first side from the first end to the second end. A second mud containment skirt extends along the second side from the first end to the second end.

The drywall mud applicator tool, as described above, differs from the prior art in that wheels are provided at both the first end and the second end of the body. This provides a significant improvement in movement of the tool along a wall, as even those prior art tools that had wheels at one end generated friction as they were skidded up and down a surface of a wall. However, the positioning of wheels at both the first end and the second end results in raising of the wall engaging applicator face away from the surface of the wall. To avoid leakage of drywall mud, the first mud containment skirt is positioned along the first side of the body and the second mud containment skirt is positioned along the second side of the body.

BRIEF DESCRIPTION OF THE DRAWINGS

These and other features will become more apparent from the following description in which reference is made to the appended drawings, the drawings are for the purpose of illustration only and are not intended to be in any way limiting, wherein.

Figure 1A:
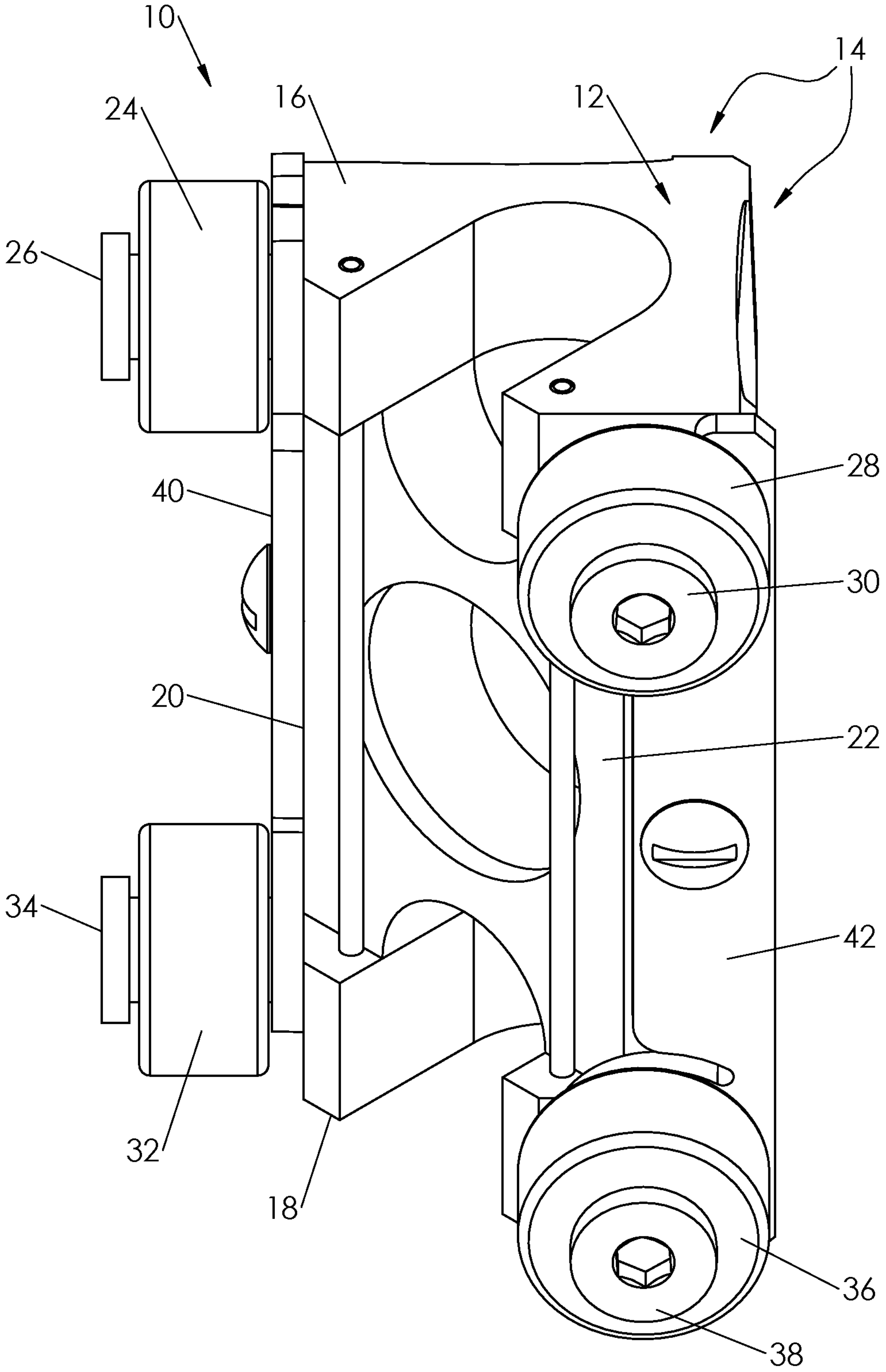
FIG. 1*a* is a rear perspective view of a first embodiment of drywall mud applicator tool having a wall engaging applicator face which is an angular wedge shape to accommodate inside corners.
Figure 1B:
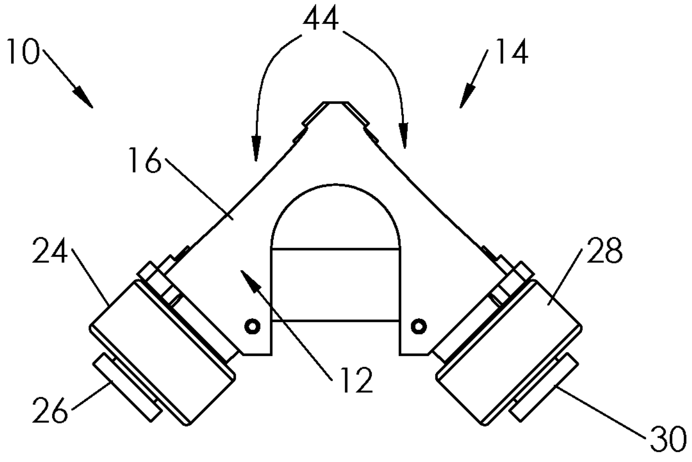
FIG. 1*b* is a top plan view of the first embodiment of drywall mud applicator tool of FIG. 1*a*.
Figure 1C:
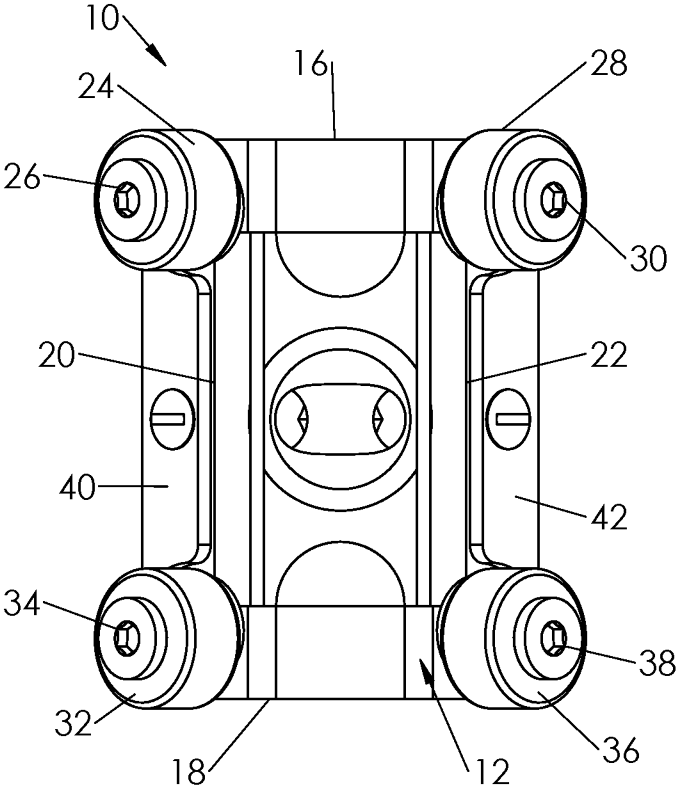
FIG. 1*c* is a rear elevation view of the first embodiment of drywall mud applicator tool of FIG. 1*a*.
Figure 1D:
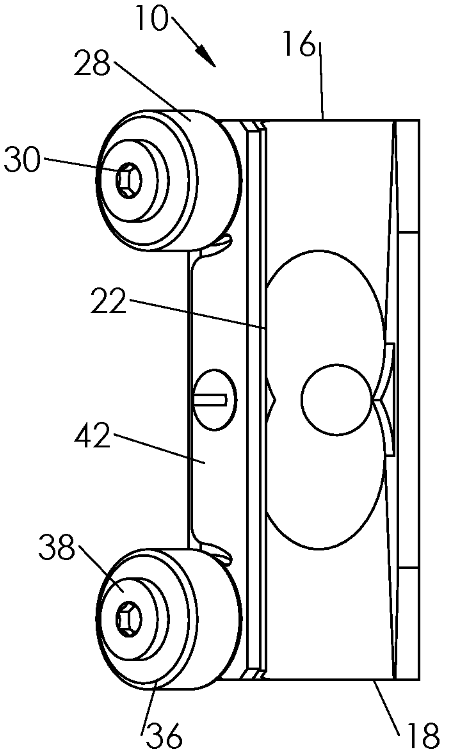
FIG. 1*d* is a side elevation view of the first embodiment of drywall mud applicator tool of FIG. 1*a*.

FIG. if is a partially exploded top plan view of the first embodiment of drywall mud applicator tool of FIG. 1*b*.

Figure 2A:
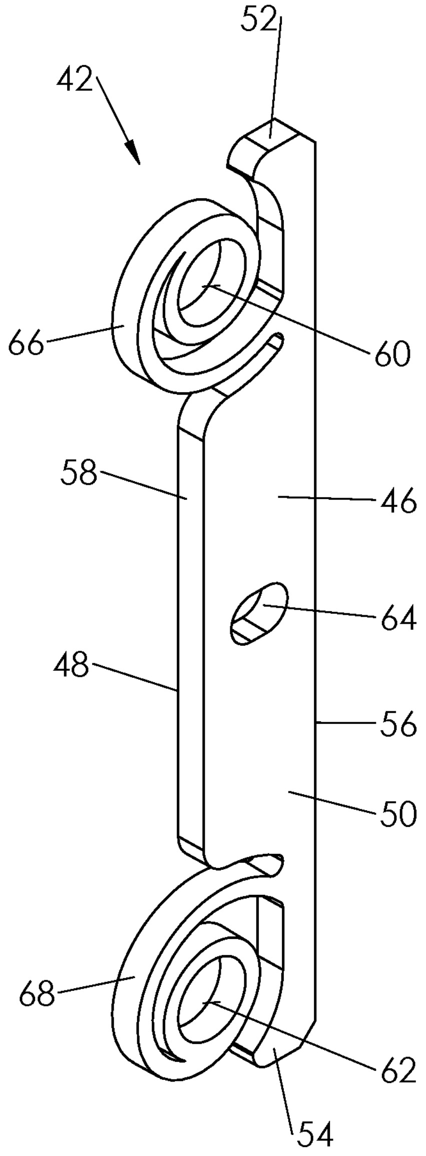

FIG. 2*a* is a perspective view of a mud containment skirt from the first embodiment of drywall mud applicator tool of FIG. 1*a*.

Figure 2B:
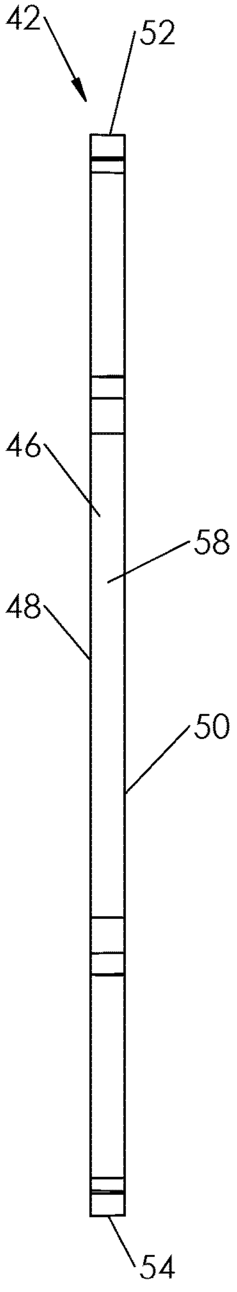

FIG. 2*b* is a top plan view of the mud containment skirt of FIG. 2*a*.

Figure 2C:
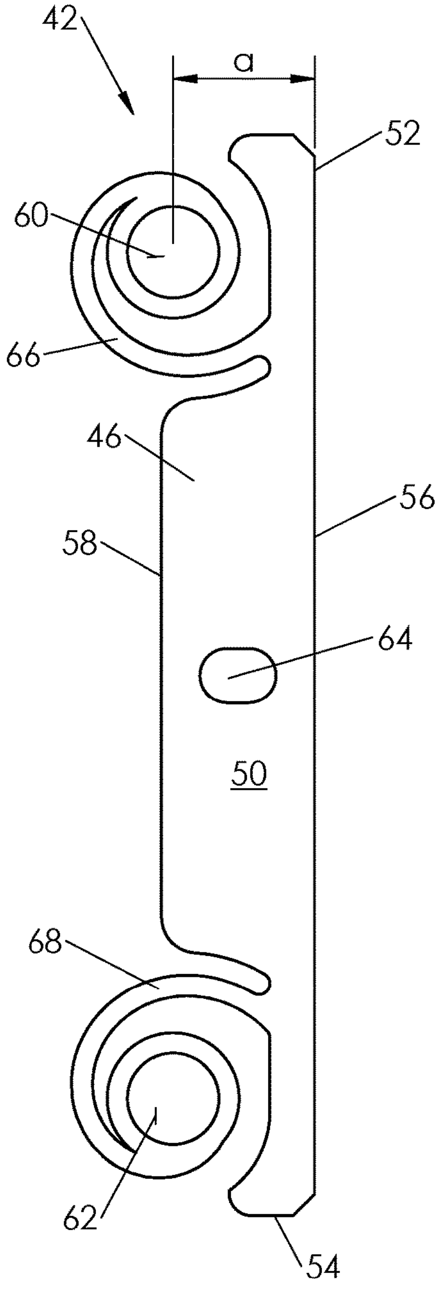

FIG. 2*c* is a side elevation view of the mud containment skirt of FIG. 2*a*, before compression.

Figure 2D:
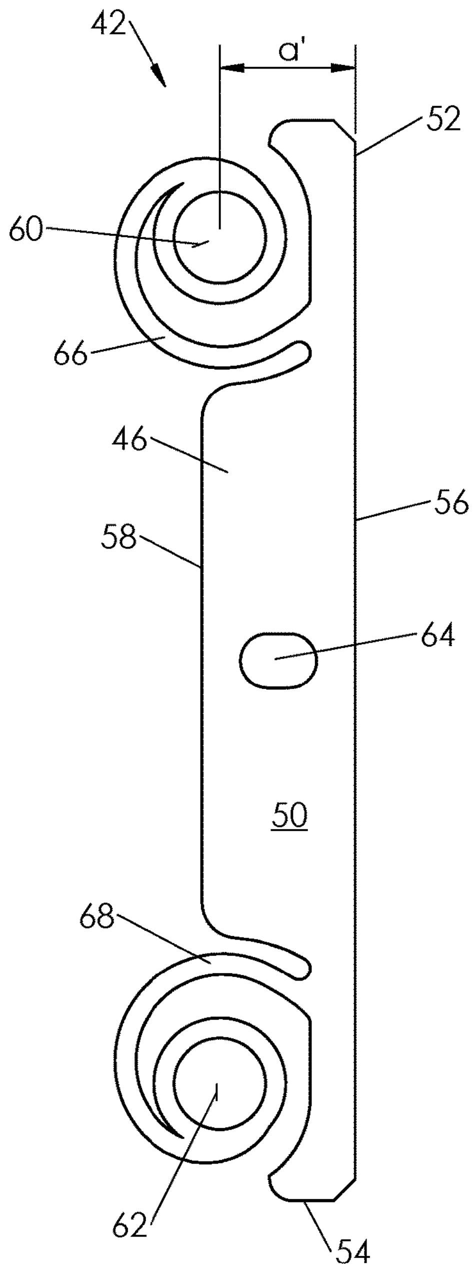

FIG. 2*d* is a side elevation view of the mud containment skirt of FIG. 2*c*, after compression against a wall.

Figure 3:
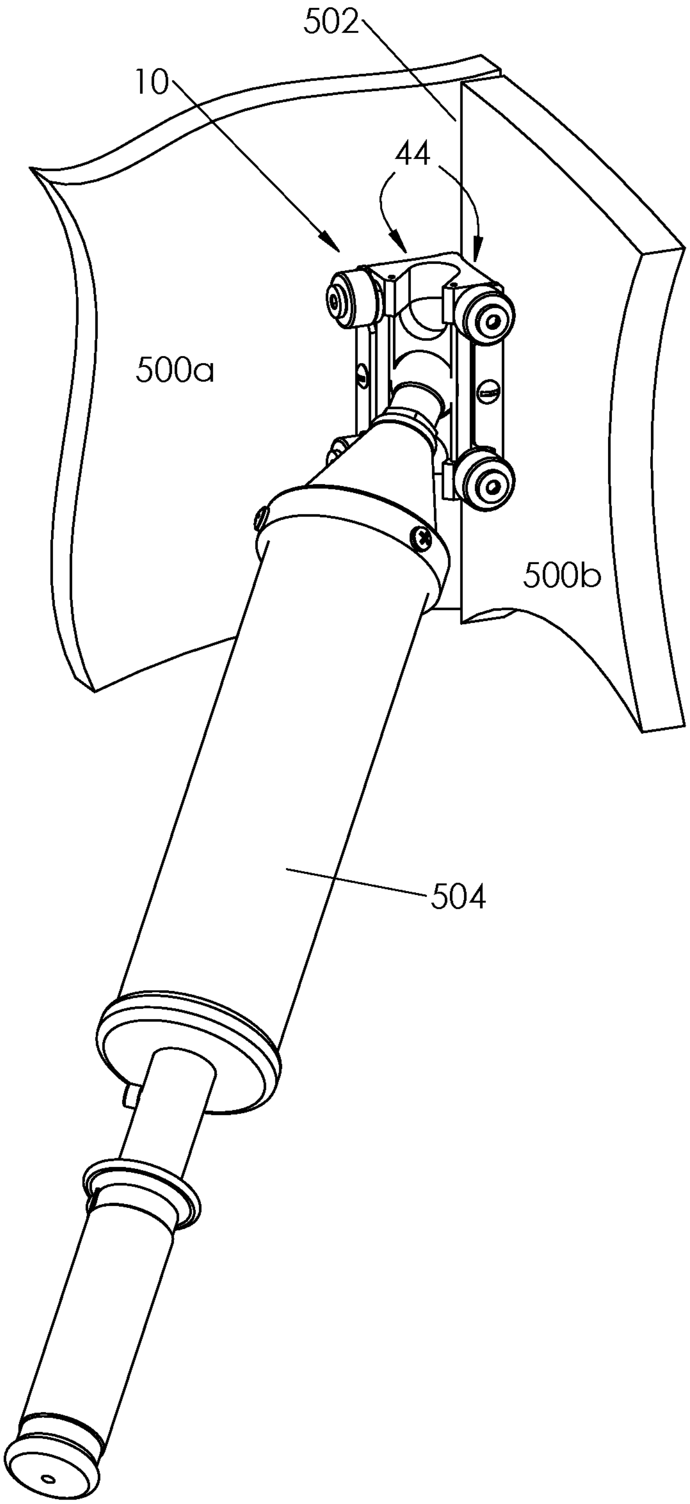

FIG. 3 is a perspective view showing the first embodiment of drywall mud applicator tool of FIG. 1*a* engaging an angular corner.

Figure 4A:
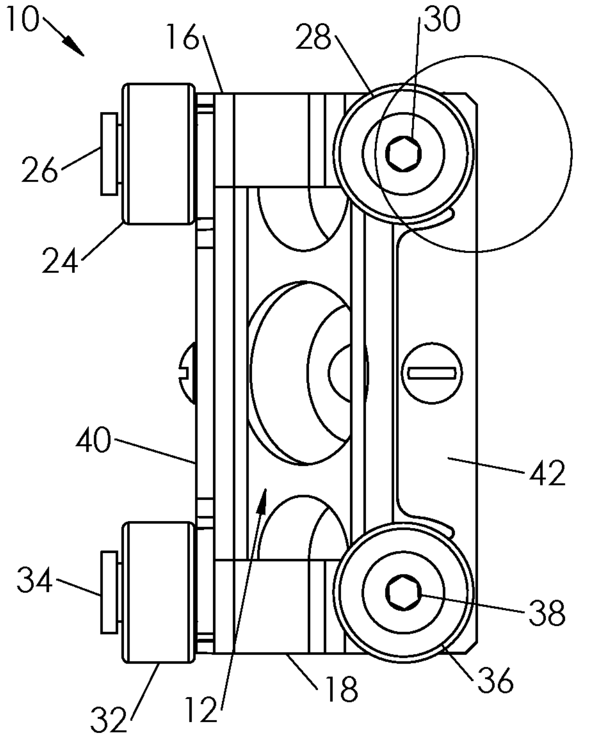

FIG. 4*a* is a perspective view showing the first embodiment of drywall mud applicator tool of FIG. 1*a* used with the mud containment skirt of FIG. 2*a*, before compression.

Figure 4B:
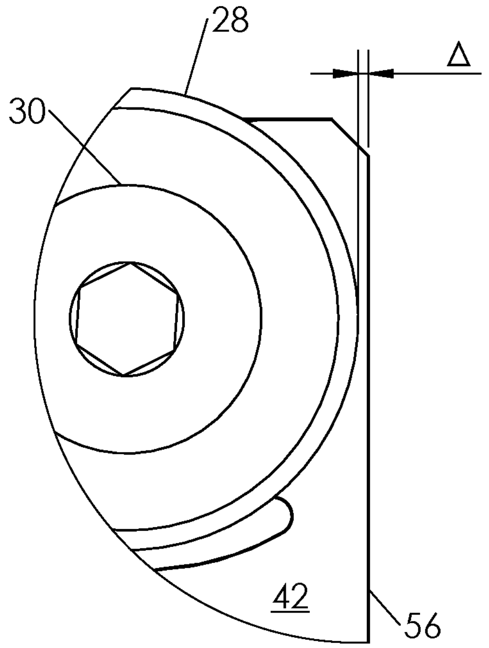

FIG. 4*b* is a detailed perspective view of FIG. 4*a*.

Figure 4C:
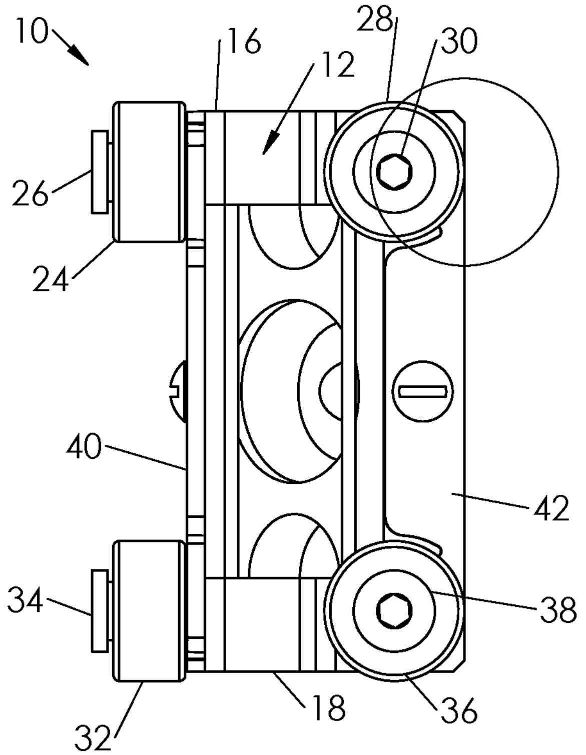

FIG. 4*c* is a perspective view showing the first embodiment of drywall mud applicator tool of FIG. 1*a* used with the mud containment skirt of FIG. 2*a*, after compression against a wall.

Figure 4D:
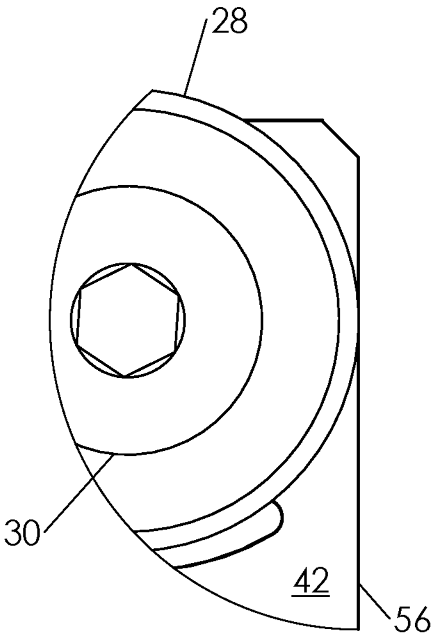

FIG. 4*d* is a detailed perspective view of FIG. 4*c*.

Figure 5A:
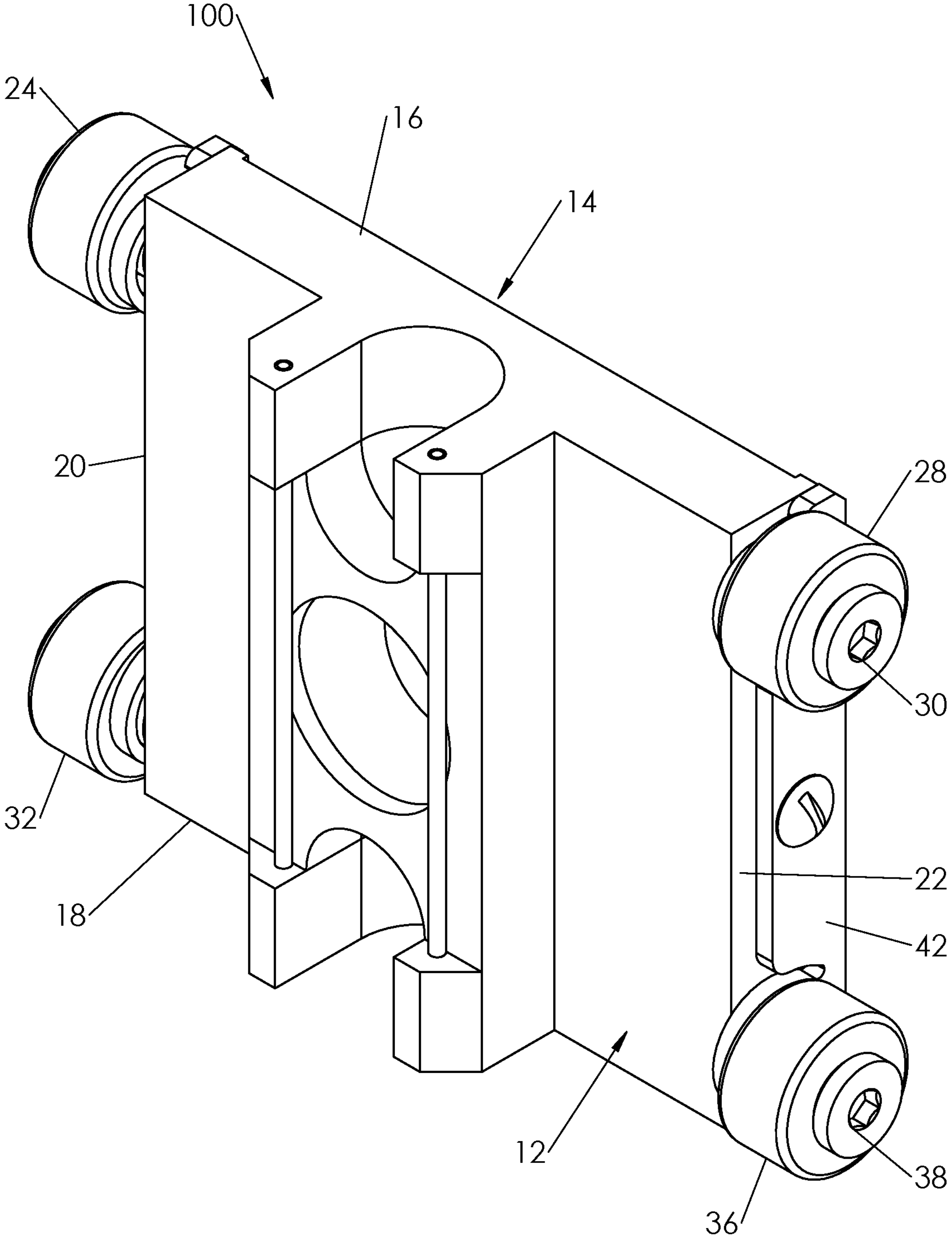

FIG. 5*a* is a rear perspective view of a second embodiment of drywall mud applicator tool having a wall engaging applicator face which is planar to accommodate flat wall surfaces.

Figure 5B:
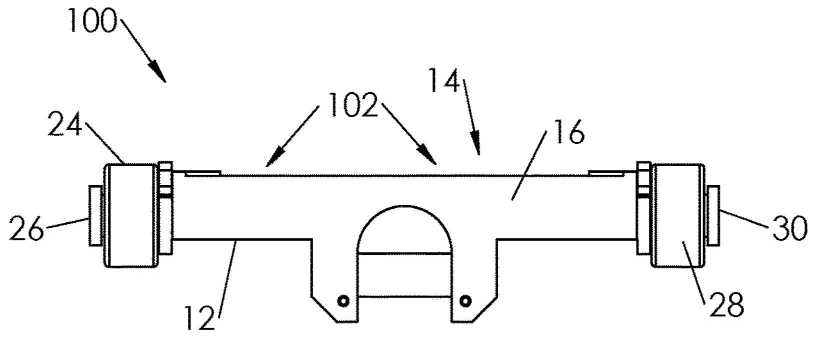

FIG. 5*b* is a top plan view of the second embodiment of drywall mud applicator tool of FIG. 5*a*.

Figure 5C:
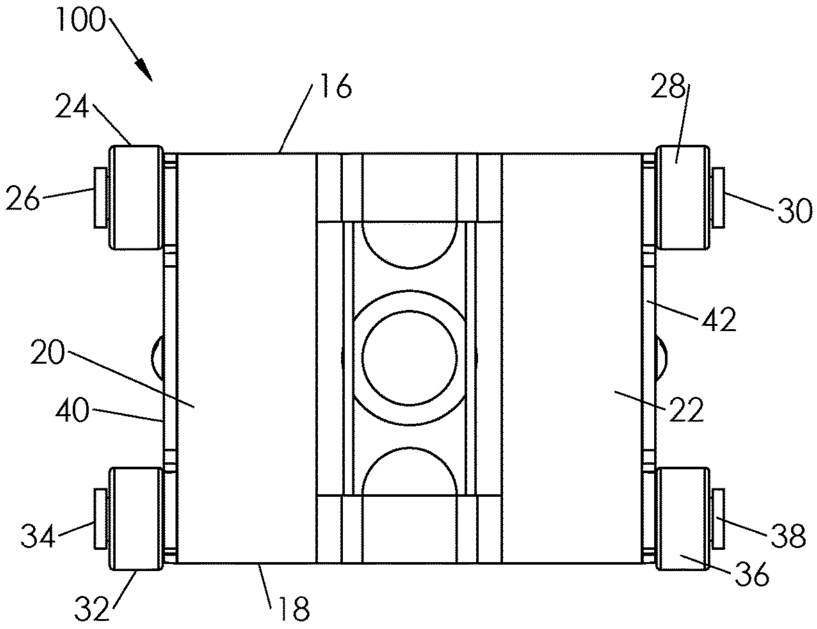

FIG. 5*c* is a rear elevation view of the second embodiment of drywall mud applicator tool of FIG. 5*a*.

Figure 5D:
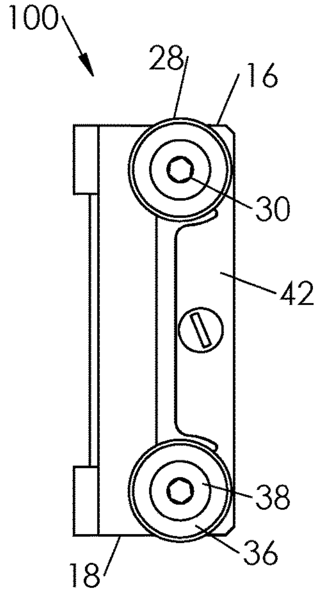

FIG. 5*d* is a side elevation view of the second embodiment of drywall mud applicator tool of FIG. 5*a*.

Figure 6A:
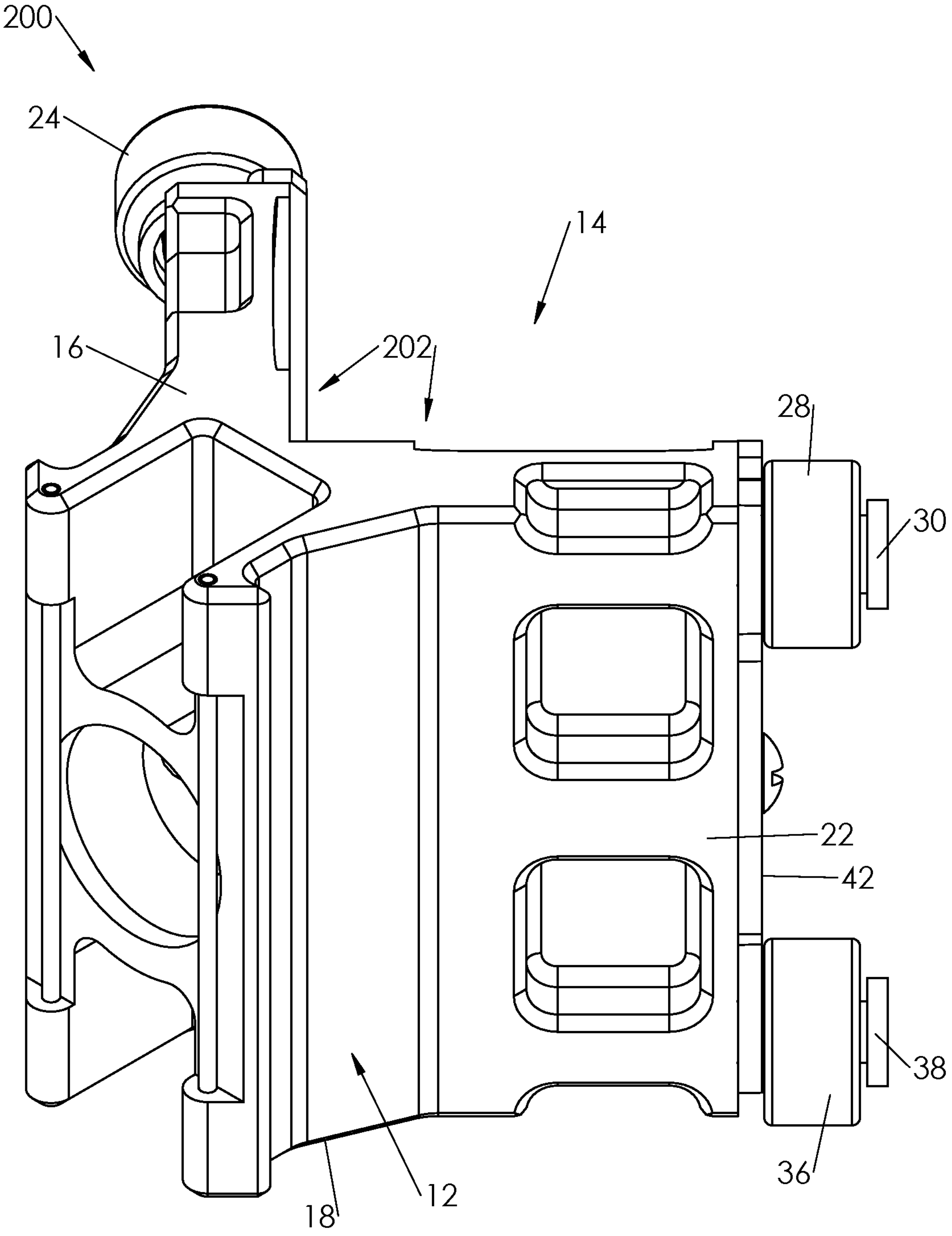

FIG. 6*a* is a rear perspective view of a third embodiment of drywall mud applicator tool having a wall engaging applicator face which defines an angular recess, to accommodate an outside corner.

Figure 6B:
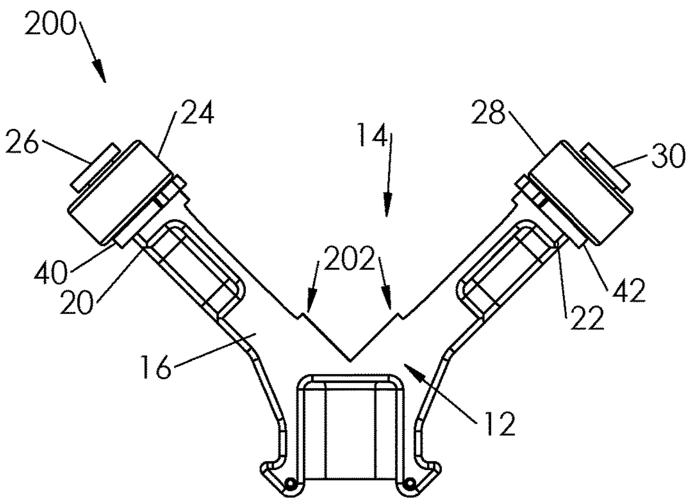

FIG. 6*b* is a top plan view of the third embodiment of drywall mud applicator tool of FIG. 6*a*.

Figure 6C:
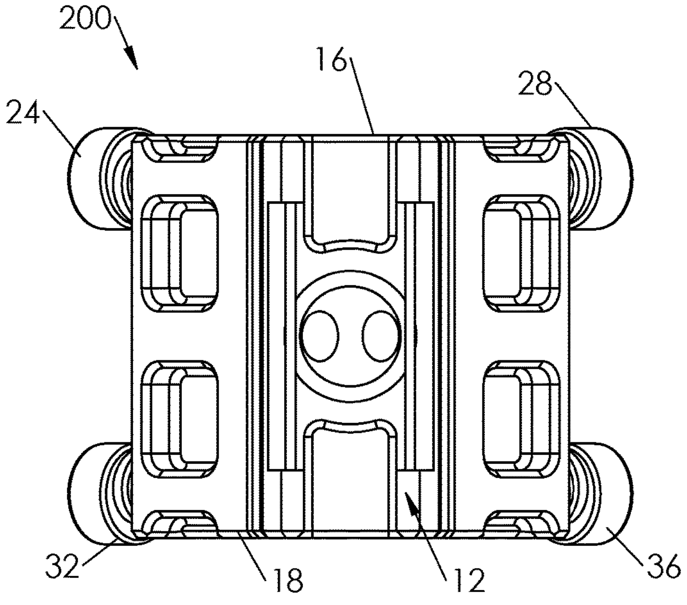

FIG. 6*c* is a rear elevation view of the third embodiment of drywall mud applicator tool of FIG. 6*a*.

Figure 6D:
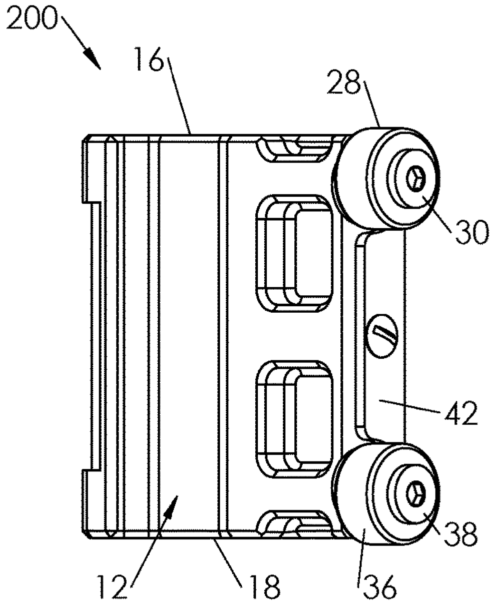

FIG. 6*d* is a side elevation view of the third embodiment of drywall mud applicator tool of FIG. 6*a*.

DETAILED DESCRIPTION

A drywall mud applicator tool will now be described with reference to FIG. 1*a* through 8*d*. A first embodiment, generally identified by reference numeral 10, will be described with reference to FIG. 1*a* through FIG. 4*d*. A second embodiment, generally identified by reference numeral 100, will be described with reference to FIG. 5*a* through FIG. 5*d*. A third embodiment, generally identified by reference numeral 200, will be described with reference to FIG. 6*a* through FIG. 6*d*.

Other than the shape of a wall engaging applicator face each embodiment has the same components. For that reasons the same reference numerals will be used to identify components common to all embodiments.

Structure and Relationship of Parts:

Referring to FIG. 1*a*, FIG. 5*a* and FIG. 6*a*, drywall mud applicator tool 10, drywall mud applicator tool 100 and drywall mud applicator tool 200, respectively, each include a body 12 having a wall engaging applicator face 14, a first end 16, a second end 18, a first side 20 and a second side 22.

In order to facilitate movement of body 12 along a wall, a first wheel 24 is mounted for rotation on an axle 26 which is secured to first side 20 of body 12 adjacent to first end 16 and a second wheel 28 is mounted for rotation on an axle 30 which is secured to second side 22 of body 12 adjacent to first end 16. There are also wheels located at second end 18 of body 12. A third wheel 32 is mounted for rotation on an axle 34 which is secured to first side 20 of body 12 adjacent to second end 18 and a fourth wheel 36 is mounted for rotation on an axle 38 which is secured to second side 22 of body 12 adjacent to second end 18.

In order to prevent leakage of mud, a first mud containment skirt 40 extends along first side 20 of body 12 from first end 16 to second end 18 and a second mud containment skirt 42 extends along second side 22 from first end 16 to second end 18.

As described above, there is a difference in the configuration of wall engaging applicator face 14 that distinguishes the various embodiments. Drywall mud applicator tool 10 is illustrated in FIG. 1*a* through FIG. 1*d*. Referring to FIG. 1*b*, wall engaging applicator face 14 of drywall mud applicator tool 10 defines an angular wedge shape 44. Referring to FIG. 3, angular wedge shape 44 of wall engaging applicator face 14 accommodates a joint on an inside corner 502 formed by adjoining walls 500*a* and 500*b*.

Drywall mud applicator tool 100 is illustrated in FIG. 5*a* through FIG. 5*d*. Referring to FIG. 5*b*, wall engaging applicator face 14 of drywall mud applicator tool 100 defines a planar surface 102. Planar surface 102 of the wall engaging applicator face 14 accommodates a joint on abutting sheets of drywall providing on a flat wall surface.

Drywall mud applicator tool 200 is illustrated in FIG. 6*a* through FIG. 6*d*. Referring to FIG. 6*b*, wall engaging applicator face 14 of drywall mud applicator tool 100 defines an angular recess 202. Angular recess 202 of wall engaging applicator face 14 accommodates a joint positioned on an outside corner formed by adjoining walls.

Referring to FIG. 2*a* through 2*c*, the preferred configuration of first mud containment skirt 40 and second mud containment skirt 42 is illustrated. Each of first mud containment skirt 40 and second mud containment skirt 42 has a flexible resilient elongated planar body 46 having opposed planar faces 48 and 50. Elongated planar body 46 has a first end 52, a second end 54, a lower bladed edge 56 and an upper edge 58. A first mounting aperture 60 extends through elongated planar body 46 at first end 52. A second mounting aperture 62 extends through elongated planar body 46 at second end 54. A slotted central mounting aperture 64 extends through elongated planar body 46 in a central position between first end 52 and second end 54. It will be noted that first mounting aperture 60 and second mounting aperture 62 are suspended by cantilever spring arms 66 and 68, respectively. Cantilever spring arms 66 and 68 accommodate limited movement of elongated planar body 46.

Figure 1E:
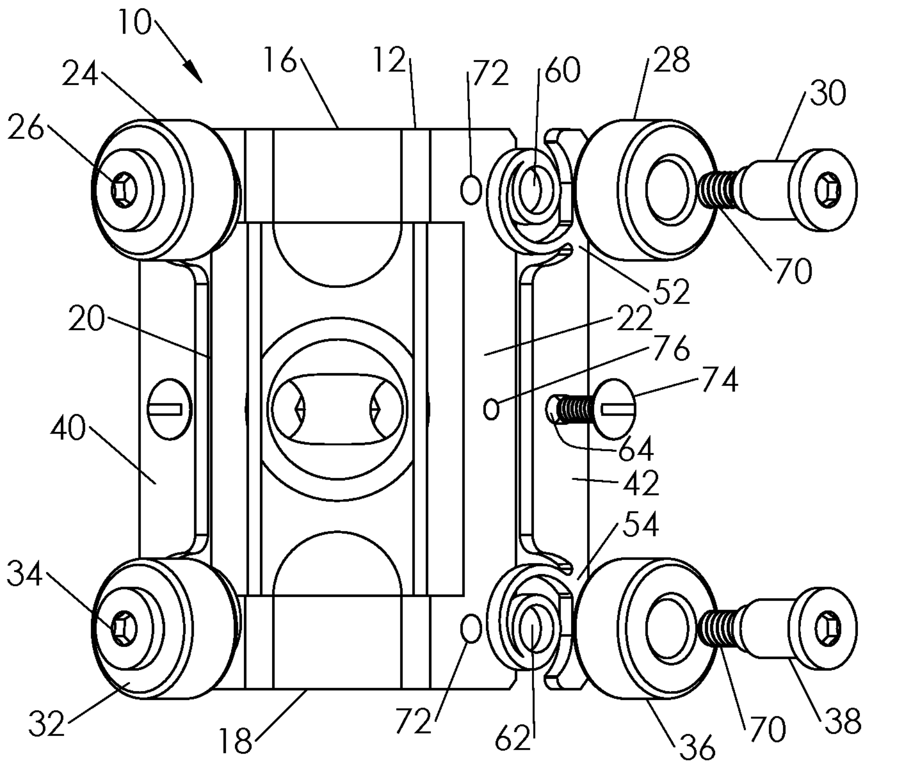
FIG. 1*e* is a partially exploded rear elevation view of the first embodiment of drywall mud applicator tool of FIG. 1*c*.
Figure 1F:
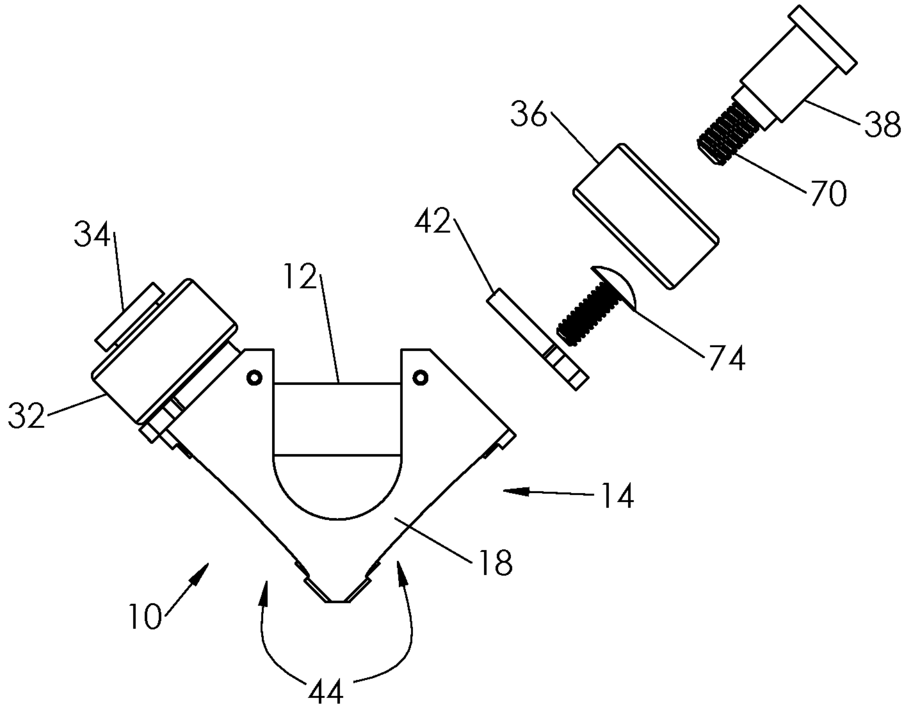

Referring to FIG. 1*e* and FIG. 1*f*, exploded views are provided to show how the wheels are mounted by axles to body 12. FIG. 1*e* illustrates second wheel 28 at first end 16 of body 12 and fourth wheel 36 at second end 18 of body 12. FIG. if illustrates fourth wheel 36 at second end 18 of body 12. Referring to FIG. 1*e*, second wheel 28 is mounted for rotation on axle 30 which is secured to second side 22 of body 12 adjacent to first end 16. Fourth wheel 36 is mounted for rotation on an axle 38 which is secured to second side 22 of body 12 adjacent to second end 18. It is to be noted that axle 30 and axle 38 have screw ends 70 that screw into threaded apertures 72 in body 12. Although corresponding exploded views have not been shown for first wheel 24 and axle 26 or third wheel 32 and axle 34, it will be understood that they are secured in a similar manner.

Referring to FIG. 1*e* and FIG. 1*f*, the manner of mounting second mud containment skirt 42 is illustrated. Axle 30 for second wheel 28 extends through first mounting aperture 60 at first end 52 of elongated planar body 46. Axle 38 for fourth wheel 36 extends through second mounting aperture 62 at second end 54 of elongated planar body 46. A screw 74 extends through slotted central mounting aperture 64 a central position on elongated planar body 46 in between first end 52 and second end 54. Screw 74 engages a threaded aperture 76 in body 12. Although a corresponding exploded view has not been provided for first mud containment skirt 40, it will be understood that first mud containment skirt 40 is secured in a similar manner.

Referring to FIG. 4*a* and FIG. 4*b*, the relative positioning of second wheel 28 and second mud containment skirt 42 prior to compression against a wall is illustrated. It will be noted that lower bladed edge 56 of elongated planar body 46 of second mud containment skirt 42 extends below wheel 28. Referring to FIGS. 4*c* and 4*d*, there is illustrated a mud containment skirt 42 after compression against a wall coplanar with wheel 28. Referring to FIGS. 2*c* and 2*d*, this difference is accommodated by a "floating" of second mud containment skirt 42. This "floating" is accommodated by the fact that first mounting aperture 60 and second mounting aperture 62 are suspended by cantilever spring arms 66 and 68, which allows for limited spring movement. This floating is also accommodated by the fact that central mounting aperture 64 through which screw 74 extends is slotted. Screw 74 keeps elongated planar body 46 of second mud containment skirt 42 against body 12 of drywall mud applicator tool 10 while allowing up and down movement accommodated by the height of slotted central mounting aperture 64. The movement of second mud containment skirt 42 can be understood by comparing FIG. 4*b* showing before compression against a wall with FIG. 4*d* showing after compression against a wall. This movement of second mud containment skirt 42 can also be understood by comparing dimension a in FIG. 2*c* showing before compression against a wall with dimension a' of FIG. 2*d* showing after compression against a wall.

Operation:

Referring to FIG. 3, apparatus 10 is mounted at the end of an extension pole 504. Referring to FIG. 4*a*, body 12 glides along on first wheel 26, second wheel 28, third wheel 32 and fourth wheel 36. As body moves, first mud containment skirt 40 and second mud containment skirt 42 confines and prevents leakage of drywall mud. Referring to FIGS. 4*a* and 4*b*, before compression against the wall lower bladed edge 56 of elongated planar body 46 of second mud containment skirt 42 extends below wheel 28. Referring to FIGS. 4*c* and 4*d*, after compression against the wall, lower bladed edge 56 of elongated planar body 46 of second mud containment skirt 42 and wheel 28 on the same plane. This "floating" of second mud containment skirt 42 is made possible by the fact that first mounting aperture 60 and second mounting aperture 62 are suspended by cantilever spring arms 66 and 68, which allows for limited spring movement. This floating is also made possible by the fact that central mounting aperture 64 through which screw 74 extends is slotted. Screw 74 keeps elongated planar body 46 of second mud containment skirt 42 against body 12 of drywall mud applicator tool 10 while allowing up and down movement accommodated by the height of slotted central mounting aperture 64.

It will be noted that although the description of operation focuses upon second mud containment skirt 42, first mud containment skirt 40 functions in the same manner.

It will be noted that although the description of operation focus upon first embodiment drywall mud applicator tool 10, drywall mud applicator tool 100 and drywall mud applicator tool 200 operate in the same manner.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A drywall mud applicator tool, comprising:

a body having a wall engaging applicator face, a first end, a second end, a first side and a second side;

a first wheel mounted for rotation on an axle which is secured to the first side adjacent to the first end;

a second wheel mounted for rotation on an axle which is secured to the second side adjacent to the first end;

a third wheel mounted for rotation on an axle which is secured to the first side adjacent to the second end;

a fourth wheel mounted for rotation on an axle which is secured to the second side adjacent to the second end;

a first mud containment skirt extending along the first side from the first end to the second end and positioned to abut a first wall portion so as to confine and mitigate leakage of drywall mud from the first side; and a second mud containment skirt extending along the second side from the first end to the second end and positioned to abut a second wall portion so as to confine and mitigate leakage of drywall mud from the second side.

2. The drywall mud applicator tool of claim 1, wherein the wall engaging applicator face is an angular wedge shape, whereby the wall engaging applicator face accommodates an inside corner formed by adjoining walls.

3. The drywall mud applicator tool of claim 1, wherein the wall engaging applicator face is planar.

4. The drywall mud applicator tool of claim 1, wherein the wall engaging applicator face defines an angular recess, whereby the wall engaging applicator face accommodates an outside corner formed by adjoining walls.

5. The drywall mud applicator tool of claim 1, wherein the first mud containment skirt is supported by the axle of the first wheel and the axle of the third wheel.

6. The drywall mud applicator tool of claim 5, wherein a fastener secures the first mud containment skirt to the first side, the fastener engaging the first side at a position between the first wheel and the third wheel.

7. The drywall mud applicator tool of claim 5, wherein the second mud containment skirt is supported by the axle of the second wheel and the axle of the fourth wheel.

8. The drywall mud applicator tool of claim 7, wherein a fastener secures the second mud containment skirt to the second side, the fastener engaging the second side at a position between the second wheel and the fourth wheel.

9. The drywall mud applicator tool of claim 1, wherein the first mud containment skirt and the second mud containment skirt are resiliently flexible.

10. The drywall mud applicator tool of claim 1, wherein each of the first and second mud containment skirts has a first mounting aperture and a second mounting aperture for mounting to the body, the first mounting aperture and a second mounting aperture are suspended by respective first and second cantilever spring arms which accommodate limited movement, towards and away from the respective first and second wall portions, of the first and second mud containment skirts when the first and second mud containment skirts are compressed against the first and second wall portions to facilitate confining of drywall mud.

11. A drywall mud applicator tool, comprising:

a body having a wall engaging applicator face, a first end, a second end, a first side and a second side;

a first wheel mounted for rotation on an axle which is secured to the first side adjacent to the first end;

a second wheel mounted for rotation on an axle which is secured to the second side adjacent to the first end;

a third wheel mounted for rotation on an axle which is secured to the first side adjacent to the second end;

a fourth wheel mounted for rotation on an axle which is secured to the second side adjacent to the second end;

a first mud containment skirt extending along the first side from the first end to the second end; and a second mud containment skirt extending along the second side from the first end to the second end, wherein the wall engaging applicator face is an angular wedge shape, whereby the wall engaging applicator face accommodates an inside corner formed by adjoining walls.

12. The drywall mud applicator tool of claim 11, wherein the wall engaging applicator face is planar.

13. The drywall mud applicator tool of claim 11, wherein the first mud containment skirt is supported by the axle of the first wheel and the axle of the third wheel.

14. The drywall mud applicator tool of claim 13, wherein a fastener secures the first mud containment skirt to the first side, the fastener engaging the first side at a position between the first wheel and the third wheel.

15. The drywall mud applicator tool of claim 11, wherein the first mud containment skirt and the second mud containment skirt are resiliently flexible.

16. The drywall mud applicator tool of claim 11, wherein each of the first and second mud containment skirts has a first mounting aperture and a second mounting aperture for mounting to the body, the first mounting aperture and a second mounting aperture are suspended by respective first and second cantilever spring arms which accommodate limited resilient movement of the first and second mud containment skirts when the first and second mud containment skirts are compressed against a wall to facilitate preventing leakage of drywall mud from the first and second sides.

17. A drywall mud applicator tool, comprising:

a body having a wall engaging applicator face, a first end, a second end, a first side and a second side;

a first wheel mounted for rotation on an axle which is secured to the first side adjacent to the first end;

a second wheel mounted for rotation on an axle which is secured to the second side adjacent to the first end;

a third wheel mounted for rotation on an axle which is secured to the first side adjacent to the second end;

a fourth wheel mounted for rotation on an axle which is secured to the second side adjacent to the second end;

a first mud containment skirt extending along the first side from the first end to the second end; and a second mud containment skirt extending along the second side from the first end to the second end, wherein the first mud containment skirt is supported by the axle of the first wheel and the axle of the third wheel.

18. The drywall mud applicator tool of claim 17, wherein a fastener secures the first mud containment skirt to the first side, the fastener engaging the first side at a position between the first wheel and the third wheel.

19. The drywall mud applicator tool of claim 17, wherein the second mud containment skirt is supported by the axle of the second wheel and the axle of the fourth wheel.

20. The drywall mud applicator tool of claim 17, wherein each of the first and second mud containment skirts has a first mounting aperture and a second mounting aperture for mounting to the body, the first mounting aperture and a second mounting aperture are suspended by respective first and second cantilever spring arms which accommodate limited resilient movement of the first and second mud containment skirts when the first and second mud containment skirts are compressed against a wall to facilitate preventing leakage of drywall mud from the first and second sides.

* * * * *